United States Patent [19]
Radev

[11] Patent Number: 5,163,537
[45] Date of Patent: Nov. 17, 1992

[54] BATTERY CHANGING SYSTEM FOR ELECTRIC BATTERY-POWERED VEHICLES

[75] Inventor: Vladimir Radev, Bristol, Va.

[73] Assignee: Simmons-Rand Company, Bristol, Va.

[21] Appl. No.: 692,927

[22] Filed: Apr. 29, 1991

[51] Int. Cl.$^5$ .............................................. B66B 9/20
[52] U.S. Cl. .................................. 187/9 R; 180/68.5;
 414/685; 414/785; 414/917
[58] Field of Search ...................... 414/917, 785, 685;
 254/2 R, 10 R, 10 C; 187/9 R; 180/68.5, 298, 299

[56] References Cited

U.S. PATENT DOCUMENTS 3,024,927  3/1962  Quayle .
3,067,887  12/1962  Quayle .
4,249,854  2/1981  Teti .
4,382,744  5/1983  Klem et al. .

FOREIGN PATENT DOCUMENTS 2443550  8/1980  France .......................... 414/785

Primary Examiner—H. Grant Skaggs
Attorney, Agent, or Firm—John J. Selko; James R. Bell

[57] ABSTRACT

A battery changing system for electric battery-powered vehicles, particularly for electric battery-powered underground mining vehicles having a main frame and a battery support attached to the main frame, and using several exchangeable batteries, the battery changing system comprising a bellcrank for connecting the battery support with the main frame, a first pin for mounting pivotably the bellcrank to the main frame, a second pin for mounting pivotably the battery support to the bellcrank, an eyebar link for connecting the battery support to the main frame in parallel with the bellcrank, a third pin for connecting pivotably the eyebar link to the main frame, a fourth pin for connecting pivotably the battery support to the eyebar link, and a hydraulic cylinder for pivoting the bellcrank around the first pin.

5 Claims, 2 Drawing Sheets

BATTERY CHANGING SYSTEM FOR ELECTRIC BATTERY-POWERED VEHICLES

BACKGROUND OF THE INVENTION

This invention relates generally to battery changing systems for electric battery-powered vehicles and more particularly to battery changing systems for electric battery-powered underground mining vehicles having a main frame and a battery support attached to the main frame.

Underground mining vehicles such as scoops, haulers, equipment movers, etc., powered by electric batteries are well known in the art. In the present battery technology, a fully charged battery normally provides electrical energy for the operation of an underground mining vehicle during one working shift of eight hours. The time necessary for charging a battery is about eight hours, and a cooling period of eight hours after the charging is usually recommended for improving the battery performance. Thus, the battery of a vehicle working more than one shift in a 24 hour period has to be charged after every shift. However, for continuous operation of a battery-powered vehicle after the battery has been discharged requires replacement by a charged battery.

Usually, the electric battery of an underground mining vehicle is arranged in a heavy steel-plate battery tray located at the rear section of the vehicle for acting as a counterweight to the useful load which is normally supported by the front section of the vehicle. The battery tray protects the battery against physical damage during the operation of the vehicle as well as during the changing of the battery. However, if the battery case itself is strong enough to protect the battery, then a separate battery tray may not be necessary. Since different arrangements of the battery may be employed, for simplicity of the description, the term "battery" is used to designate the whole exchangeable battery set, including the battery tray, if the battery is arranged in such a tray.

During operation of the vehicle, the battery is somehow secured to the structure of the vehicle which supports the battery. However, the vehicle has a battery changing system, usually using hydraulic power, for moving the battery up and down during a battery changing operation. The combination of the vertical motion of the battery provided by the battery changing system and the horizontal motion of the vehicle itself, enables the operator to unload the discharged battery from the vehicle onto a stand of a battery charging station, and to load a fresh battery from a stand of the battery charging station onto the vehicle.

There are generally two different types of battery changing systems, in relation with the battery support, which are well known in the art. In the first type, the battery lays on the bottom plate of the vehicle main frame, which bottom plate is uninterrupted or cut in a "U" shape. Two rigid vertical hydraulic cylinders, acting upon horizontal brackets on the left and right sides of the battery, move the battery up and down during a battery changing operation. The major disadvantage of this first type battery changing system is that the battery cannot be moved in a position lower than its normal position on top of the vehicle bottom plate. In the second type battery changing system the battery is loaded on and secured to a battery support, such as a fork, or a platform, or a "U" shaped structure, etc., which battery support, under the action of vertical hydraulic cylinders, moves up and down during a battery changing operation. The battery support is guided to move in the vertical direction by two parallel members attached firmly to the main frame of the vehicle. This second type of battery changing system is similar to the well known load-lifting system of a fork-lift truck. The major disadvantages of this second type battery changing systems are: first, the vertical travel of the battery is very short, because the lengths of the vertical hydraulic cylinders and parallel guides are limited by the height of the vehicle main frame, which in most cases is very short; and second, the parallel guides of the battery support are complicated and unreliable because it is difficult to keep them clean in an underground mine environment.

The foregoing illustrates limitations known to exist in present battery changing systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of this invention, this is accomplished by providing a battery changing system for electric battery-powered vehicles, particularly for electric battery-powered underground mining vehicles having a main frame and a battery support attached to the main frame, and using several exchangeable batteries, the battery changing system comprising a bellcrank for connecting the battery support with the main frame, a first pin for mounting pivotably the bellcrank to the main frame, a second pin for mounting pivotably the battery support to the bellcrank, an eyebar link for connecting the battery support to the main frame in parallel with the bellcrank, a third pin for connecting pivotably the eyebar link to the main frame, a fourth pin for connecting pivotably the battery support to the eyebar link, and a means for pivoting the bellcrank around the first pin.

The foregoing and other aspects will become apparent from the following detailed description of the invention when considered in conjunction with the accompanying drawing figures.

BRIEF DESCRIPTION OF THE DRAWING FIGURES

FIG. 1 is a schematic partial top view of an underground mining vehicle including an embodiment of a battery changing system according to this invention; and FIG. 2 is a sectional view substantially through vertical plane A—A of FIG. 1.

DETAILED DESCRIPTION

Figure 1:
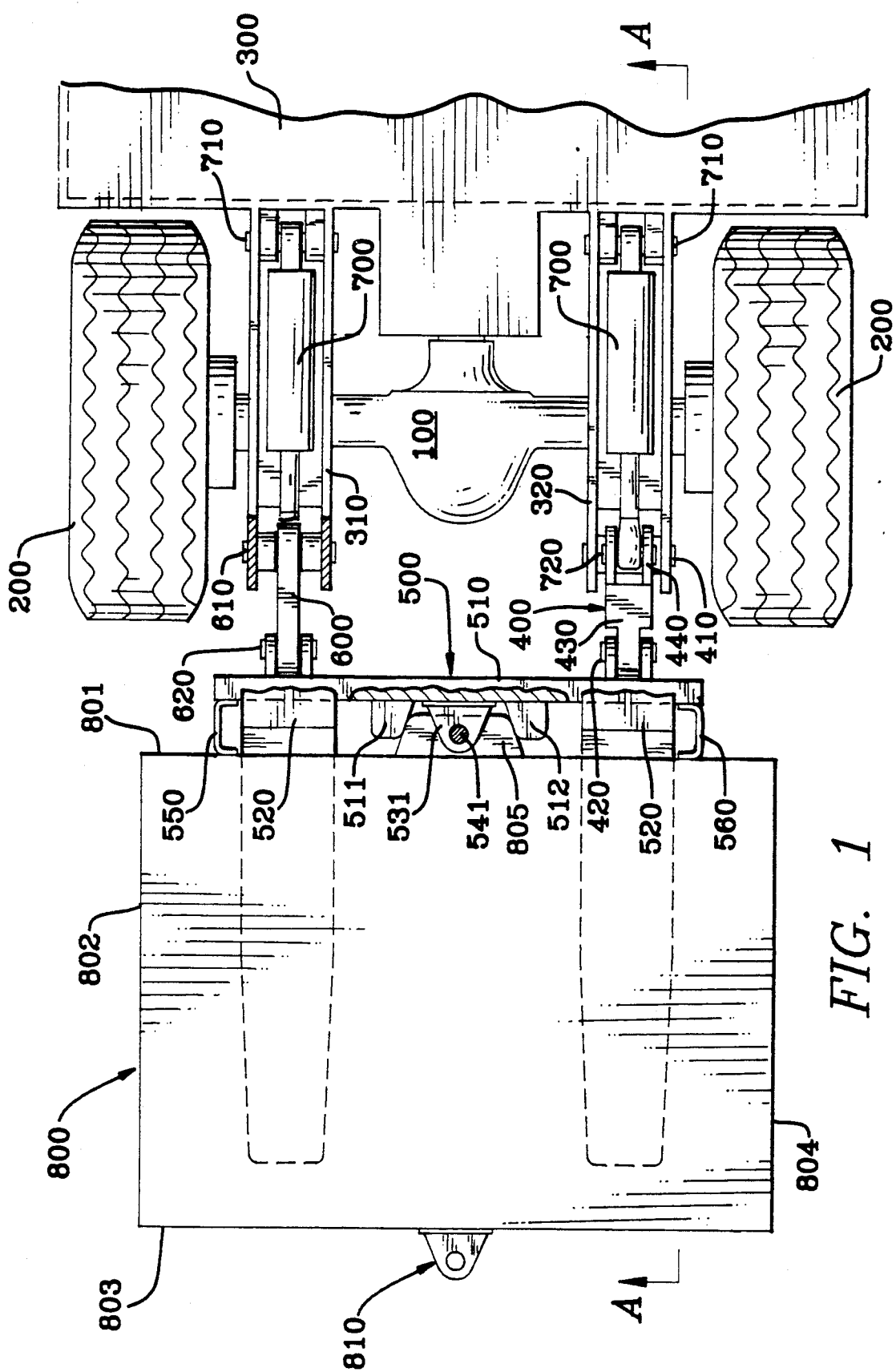
Figure 2:
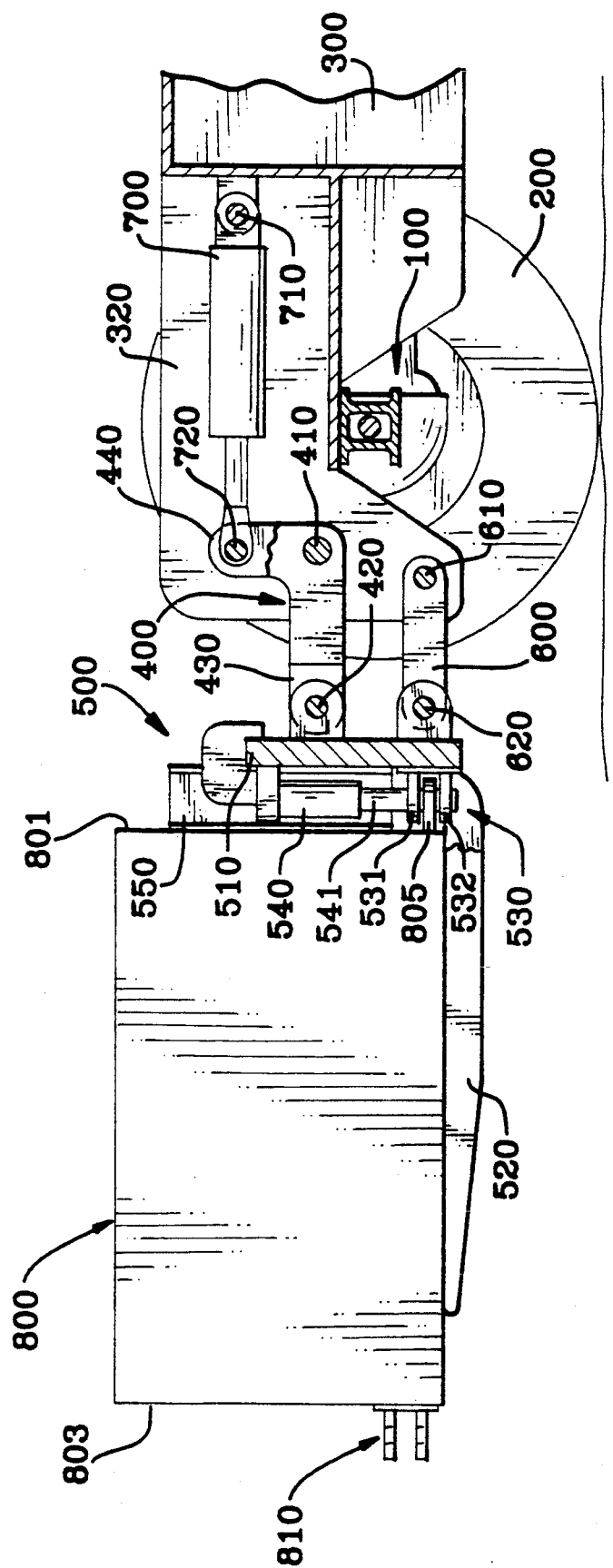

Referring to FIG. 1 and FIG. 2, axle 100 and wheels 200 support a rear part of vehicle main frame 300. A pair of identical bellcranks 400 are mounted pivotably, respectively, to a left and a right extensions 310 and 320 of main frame 300 through a first pair of coaxial pins 410. A battery support being a fork support 500 is attached pivotably to substantially horizontal arms 430 of bellcranks 400 respectively through a second pair of coaxial pins 420. A pair of identical eyebar links 600 connect also battery support 500 to main frame 300.

These connections are in parallel with the connections between the battery support and the main frame realized by horizontal arms 430 of the bellcranks 400, as described above. A third pair of coaxial pins 610 connect pivotably the eyebar links 600 respectively to extensions 310 and 320 of the main frame 300, and a fourth pair of coaxial pins 620 connect pivotably the battery support 500 respectively to the pair of eyebar links 600. All four pair of pins are parallel. The distance between the axes of the first and second pins 410 and 420 is equal to the distance between the axes of the third and fourth pins 610 and 620, and the distance between the axes of the first and third pins 410 and 610 is equal to the distance between the axes of the second and fourth pins 420 and 620. A pair of identical hydraulic cylinders 700 are connected pivotably to the main frame 300 and to substantially vertical arms 440 of the bellcranks 400 respectively through a pair of cylinder pins 710 and a pair of rod-end pins 720. These pins are parallel to the above described pins. Battery 800 is loaded on a pair of fork angles 520 firmly mounted to a main vertical plate 510 of the battery support 500. The battery 800 is secured to the battery support 500 by a hitch pin 541 inserted in the matching holes of a hitch 530, firmly connected to the main vertical plate 510 of the battery support, and of a connecting tapered plate 805, firmly connected to the battery 800. Hitch pin 541 is also the rod of a hydraulic cylinder 540 firmly attached to the main vertical plate 510 of the fork support 500. Through the action of the hydraulic cylinder 540, the hitch pin can be selectively moved up or down to allow the removal of the discharged battery during a battery changing operation, or to securing the battery onto the battery support during the operation of the vehicle. The connecting tapered plate 805 extends from front vertical side 801 of the battery 800 between the upper and the lower plates 531 and 532 of the hitch 530. A pair of a left and a right stops 550 and 560 firmly attached to the main vertical plate 510 of the battery support 500 extend to the front vertical side 801 of the battery 800 and thus limit the position of the battery relatively to the battery support in longitudinal direction. The stops also limit the possibility of the battery pivoting around the hitch pin under the action of the battery mass forces. A pair of left and a right tapered plates 511 and 512 firmly attached to the main vertical plate 510 of the fork support 500 match the tapered sides of said connecting tapered plate 805 of the battery 800. During loading of a fresh battery, the pair of tapered plates 511 and 512 guide the connecting tapered plate 805 for aligning the hole in the tapered plate 805 with the hole of the hitch 530. Appropriate clearances between the connecting tapered plate 805 and hitch plates 531 and 532 are provided. A tow hitch 810 is attached firmly to the center of the rear vertical side 803 of the battery 800.

When the pair of hydraulic cylinders 700 are actuated to extend or retract they will rotate respectively the pair of bellcranks 400 around the first pair of coaxial pins 410 in one or other direction. Since the substantially horizontal arms 430 of the bellcranks 400 and the pair of eyebar links 600 form respectively a pair of identical parallelograms, during the rotation of the bellcranks the fork support 500 will move up or down in a translation following an arch but remaining parallel to itself. During a battery changing operation the fork support can be lowered to the ground, therefore a very simple and very low battery stand can be used, which is one of the major advantages of this invention. Normally, during operation of the vehicle, the battery support will be kept at a height providing the same ground clearance as provided by the main frame of the vehicle. However, if the vehicle negotiates a very uneven or bumpy terrain, the hydraulic cylinders can be retracted and the battery support lifted and kept substantially above the normal level, which will increase significantly the approach and departure angles of the battery end of the vehicle. This is another major advantage of a battery changing system according to this invention.

In a battery changing system having a fork support, such as described above, there is no structure of the main frame of the vehicle around the battery, which reduces significantly the width of the rear end of the vehicle. This improves the maneuverability of the vehicle, which presents another advantage of this invention.

From FIG. 1, FIG. 2 and the description, it is obvious that instead of a fork support, other structures, such as a single platform, or a "U" shaped structure extending along the left and right sides 802 and 804 of the battery 800, can be firmly attached to the main vertical plate 510 of the battery-support 500, and used for supporting the battery. It is also obvious that instead of the described hitch, other means can be used for securing the battery onto the battery support. For example, instead of the hydraulically actuated hitch pin, a manually removable hitch pin can be used. Also, instead of one centrally located hitch, the system could have two hitches located at the both sides of the center line of the vehicle, etc.

From FIG. 1, FIG. 2 and the description, it is also obvious that the left side and the right side of the described battery changing system are identical. In most cases a system such as the described one, having two bellcranks, two hydraulic cylinders and two eyebar links, may be necessary for providing enough stable support to the battery support. However, if a single bellcrank is centrally located and if it is wide enough to support the battery support, a battery changing system according to this invention can have only one bellcrank, one eyebar link, one hydraulic cylinder, and respective connecting pins in the same relationship as described above.

Having described the invention, what is claimed is:

1. A battery changing system for electric battery-powered vehicles, particularly for electric battery-powered underground mining vehicles having an axle and wheels supporting a main frame above a ground surface and a battery support attached to said main frame, and using exchangeable batteries, said battery changing system comprising:

a bellcrank connecting said battery support with said main frame;

a first pin mounting pivotably said bellcrank to said main frame;

a second pin mounting pivotably said battery support to said bellcrank;

an eyebar link connecting said battery support to said main frame in parallel with said bellcrank;

a third pin connecting pivotably said eyebar link to said main frame, said third pin positioned below said axle;

a fourth pin connecting pivotably said battery support to said eyebar link, and means for pivoting said bellcrank around said first pin, whereby said battery support can be lowered to the ground.

2. A battery changing system according to claim 1, wherein said means for pivoting said bellcrank around said first pin is a hydraulic cylinder.

3. A battery changing system according to claim 1, wherein said battery support is a fork support.

4. A battery changing system according to claim 1, further comprising:
means for securing said battery onto said battery support.

5. A battery changing system according to claim 4, wherein said means for securing said battery onto said battery support comprises a hitch and a hitch pin for selectively connecting and disconnecting said battery to and from said battery support, and a pair of a left and a right stops for limiting the pivoting of said battery around said hitch pin.

* * * * *

UNITED STATES PATENT AND TRADEMARK OFFICE
CERTIFICATE OF CORRECTION

PATENT NO.  : 5,163,537
DATED       : November 17, 1992
INVENTOR(S) : Vladimir Radev It is certified that error appears in the above—identified patent and that said Letters Patent is hereby corrected as shown below: Substitute the following for Fig. 2.

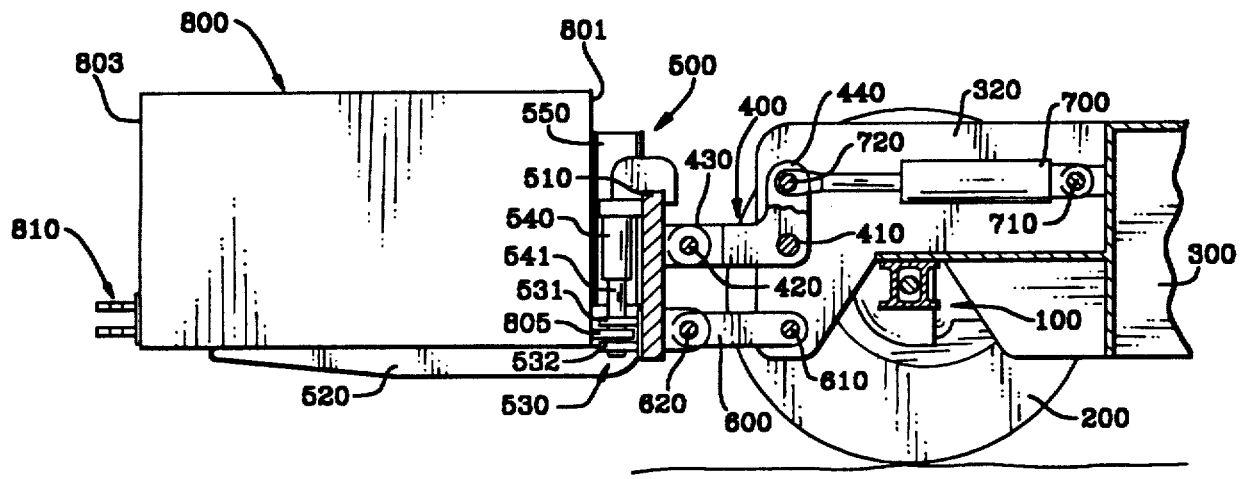

FIG. 2

Signed and Sealed this

Twenty-third Day of November, 1993

Attest:

BRUCE LEHMAN

Attesting Officer

Commissioner of Patents and Trademarks